United States Patent [19]

Zussman

[11] Patent Number: 5,370,898
[45] Date of Patent: Dec. 6, 1994

[54] METHOD OF MAKING FOOD CHIP PRODUCTS

[75] Inventor: David T. Zussman, Newton, Mass.

[73] Assignee: Fit-Food, Inc., Newton Centre, Mass.

[21] Appl. No.: 197,318

[22] Filed: Feb. 16, 1994

Related U.S. Application Data

[63] Continuation-in-part of Ser. No. 899,630, Jun. 16, 1992, abandoned.

[51] Int. Cl.$^5$ .......................... A23L 1/01; A23L 1/217
[52] U.S. Cl. .................................. 426/615; 426/523; 426/637
[58] Field of Search .............. 426/637, 456, 464, 467, 426/523, 808, 615

[56] References Cited

U.S. PATENT DOCUMENTS

| | | | |
|---|---|---|---|
| 3,493,390 | 2/1970 | Succo . | |
| 3,519,432 | 7/1970 | Succo et al. . | |
| 4,154,861 | 5/1979 | Smith | 426/523 X |
| 4,277,510 | 7/1981 | Wicklund et al. | 426/441 |
| 4,348,417 | 9/1982 | Greup et al. | 426/19 |
| 4,455,321 | 6/1984 | Glabe et al. | 426/549 |
| 4,701,340 | 10/1987 | Bratton et al. | 426/523 X |
| 4,756,916 | 7/1988 | Dreher et al. | 426/302 |
| 4,873,093 | 10/1989 | Fazzolare et al. | 426/28 |
| 4,873,107 | 10/1989 | Archer | 426/523 X |
| 4,906,483 | 3/1990 | Kloos | 426/243 |
| 4,919,965 | 4/1990 | Childers, Jr. | 426/615 |
| 5,154,861 | 5/1979 | Smith | 426/523 X |
| 5,194,277 | 3/1993 | Laufer | 426/243 |
| 5,202,139 | 4/1993 | Gaon et al. | 426/242 |

FOREIGN PATENT DOCUMENTS 296039A 12/1988 European Pat. Off. .
61-1350 6/1984 Japan .

Primary Examiner—Arthur L. Corbin
Attorney, Agent, or Firm—Wolf, Greenfield & Sacks

[57] ABSTRACT

A cooking process for food chip products that does not involve oil-based cooking. The process includes slicing and/or shaping food, washing starch from the sliced or shaped food with water and forming multiple layers of the food product. The multiple-layered food product is baked in an impingement oven under conditions sufficient to form a fluidized bed of layered food product. The pressure is varied within the impingement oven to further release moisture. After baking, the food chips are dried and optionally seasoned.

9 Claims, 2 Drawing Sheets

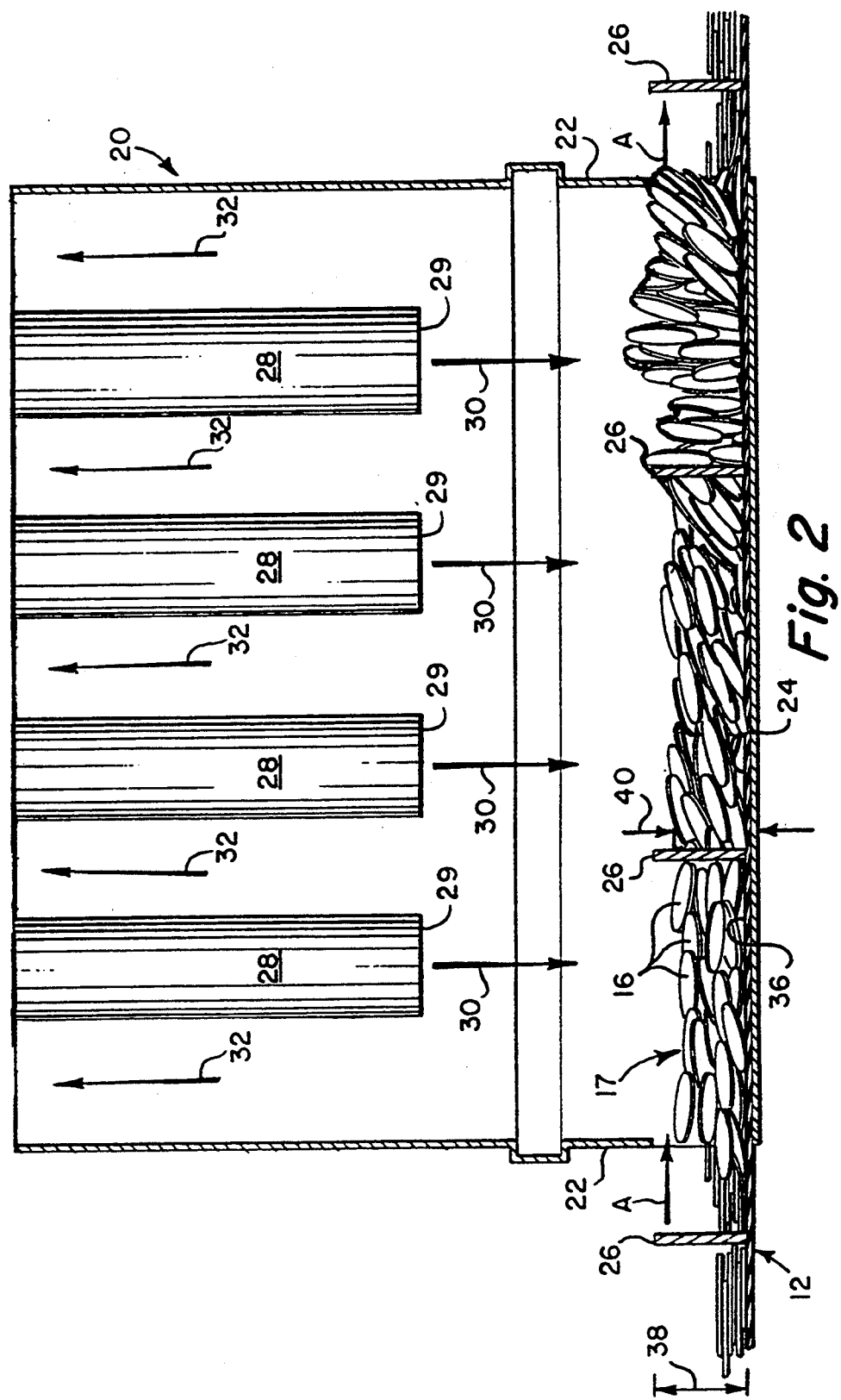

METHOD OF MAKING FOOD CHIP PRODUCTS

This application is a continuation-in-part application of co-pending U.S. application Ser. No. 07/899,630, filed Jun. 16, 1992.

BACKGROUND OF THE INVENTION

1. Field of the Invention

The present invention is directed to a method of making food chip products and, more particularly, to a method of making food chip products without cooking oil.

2. Description of the Prior Art

Food chip products such as potato chips and corn chips are popular snack items that typically are obtained by frying potato or corn slices in hot oil so that moisture content of the slices are reduced to a very low level. Fried potato chips prepared using conventional methods usually have an oil or fat content from about 35 percent to about 40 percent by weight.

There have been numerous efforts in the past to reduce the amount of oil in potato chips, but most of these still involve applying some fat or oil to the chip. Nevertheless, the prior art processes have one or more methodological drawbacks that may result in chips having undesirable texture, flavor or color. Also many of the previously published processes are not economically feasible for large scale food chip product production.

For example, Dreher et al., U.S. Pat. No. 4,756,916, is directed to a process for producing low oil potato chips comprising washing potato slices with an aqueous solution, and applying oil to the washed slices to coat the slices with oil. The amount of oil applied to the washed slices is adjusted to achieve an oil content of about 10–25 weight percent in the final product. The oil coated slices are blanched, essentially pre-frying the slices due to the oil coating, and then baked at a temperature of at least about 390° F. to partially dry the slices. The partially dried slices are then further baked at a lower temperature of between about 290° F. (140° C.) to 320° F. (160° C.) to finish drying the slices. The Dreher reference specifically points that oil addition before baking is necessary for the proper development of fried potato chip flavors, and if oil is only added after baking, chip texture is hard and the fried potato chip flavor is not developed. Therefore, while the Dreher reference teaches that oil addition can be completed before or after baking, if oil is added only after baking the chip is less acceptable to consumers.

Kloos, in U.S. Pat. No. 4,906,483, is directed to a process for producing potato products having a no-fat, no-cholesterol and salt-free ingredient characteristics. The Kloos process includes placing a pan containing previously rinsed and sliced potatoes submerged in water into a microwave oven until the submerged potatoes are visibly transparent. After the potatoes are transparent, the water is replaced with cold water to remove visible starch. Once the potatoes are rinsed, they are arranged on a non-stick cooking sheet and are placed in a conventional radiant heat oven for browning and crispening. While disclosing a cooking process for producing potato products without externally-added oil, the reference teaches a process with the combined utilization of a microwave and a conventional radiant heat oven. Similarly, Gaon et al., in U.S. Pat. No. 5,202,139, discloses a process for preparing essentially fat free chips. The process involves cutting and washing raw potatoes, predrying and arranging the sliced potatoes on a conveyor. The slices are arranged on the conveyor in a single layer only and are then exposed to a high intensity microwave field. The slices are then seasoned and exposed to a lower intensity microwave field. While disclosing a process for producing essentially fat free chips, only a single layer of product can be processed. This limitation is due to the nature of microwave cooking and will result in less efficient chip production than a process which can cook multiple layers of food product slices.

Childers, Jr., in U.S. Pat. No. 4,919,965, is directed to a method of processing agricultural produce slices and, more particularly, potato slices by a toasting process. The toasting process occurs by compressive, opposed, contact surfaces which toast sliced produce in a fat and oil-free environment. More specifically, the Childers process includes washing raw agricultural produce and slicing the produce into thin slices. A seasoning is then applied to the slices. The slices are then cooked under heat and pressure imposed between an opposing pair of heating surfaces so as to drive out moisture and toast the slices.

Fazzolare et al., in U.S. Pat. No. 4,873,093, discloses a product and process for preparing a baked snack food from gelatinized starch ingredients. The process of the invention comprises mixing at least one ingredient having starch, such as potatoes, with water to form a composition which is steamed to form a dough-like consistency. The dough-like composition is then machined to form pieces which are baked in a conventional oven. During baking the exterior layer of the dough-like composition cooks rapidly and traps steam in the interior portion of the dough. An alternative embodiment of the process includes applying a spray oil to the pieces before baking to obtain a final product having a flat, cracker-like appearance. In addition, a post-bake oil application is optional and included in a preferred embodiment.

The concern and significant consumer interest in weight control and reduced intake of fats and oils make it important to reduce or eliminate the oil content of food chips.

SUMMARY OF THE INVENTION

The present invention includes a cooking process for producing food products as food chips without cooking oils.

The food product is then washed with water to remove extractable surface starch. The slices are then multi-layered. No cooking oil is added. The multiple layers of food product are then transported to an oven and are baked under process conditions for a period sufficient to further remove moisture and cook the food product as multiple layers in a fluidized bed of hot air or steam. Once the multiple layers of food product are completely cooked, the product is dried and seasoned. The final product is an oven-baked chip that has a taste, texture and appearance of conventional fried chip products. The preferred oven is an impingement-type oven utilizing forced hot air or steam.

Preferably, the baking process occurs over a temperature range of between about 300° F. (150° C.) and about 450° F. (230° C.) for between about 5.0 and about 7.0 minutes. The air pressure within the oven that is applied to the fluidized bed of food product is preferably varied over the cooking time. Most preferably, the pressure decreases from about 6.5 inches $H_2O$ to about 1.5 inches $H_2O$ of static pressure of forced hot air or steam.

A unique aspect of the process comprises forming the multiple layers of food product on a continuous conveyor belt that has a plurality of ridges running perpendicular to the long axis of the belt. These ridges pull food along the belt and create mutual movement between the fluidized bed of the food product and the underlying conveyor belt. This ensures complete cooking of the food product and more even moisture removal. Preferably, at least a portion of the belt is coated with a non-stick layer such as polytetrafluoroethylene (for example, Teflon ® synthetic resin polymer, a trademark of E.I. DuPont de Nemours & Company, Wilmington, Del.).

It is an object of the invention to provide a process for making food chips that provides a fat and oil free chip product that has the taste, texture and appearance of conventionally-made chip products.

It is a further object of the invention to provide a process of oven baking food chips that utilizes an impingement oven for the entire cooking process and involves no oil-based cooking.

BRIEF DESCRIPTION OF THE DRAWINGS

FIG. 2 schematically illustrates a fluidized bed impingement oven that can be used in the production of food chip products according to the process shown in FIG. 1.

DETAILED DESCRIPTION OF THE INVENTION

Figure 1:
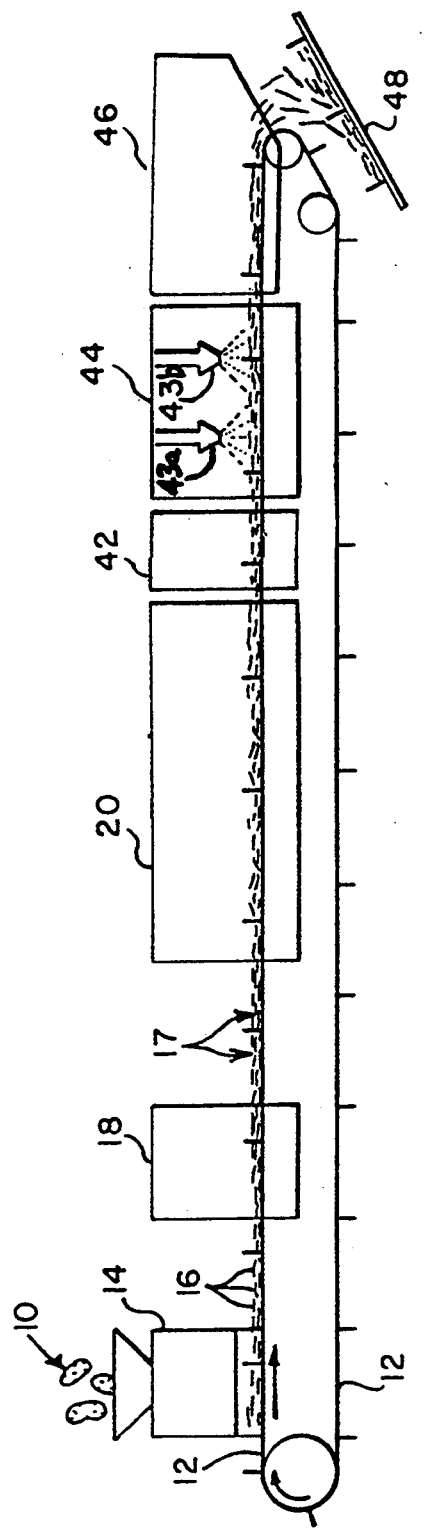
FIG. 1 schematically illustrates the production of food chip products according to one embodiment of the method of the present invention along the production line from beginning to end.

The present invention pertains to a method of making an oven-baked food chip product that has the taste, texture and appearance of a conventionally fried food chip. The term "food chip" refers to food products that are configured into conventionally-shaped potato chip-like slices. The foods that can be used in the process of the invention are substantially any foods that can be reshaped directly from their raw state. These foods include bananas, plantaines, turnips, potatoes, sweet potatoes, yams and the like. Other foods, including rice and corn, can also be manipulated to form slices and can be used in the process of the invention. For example, corn food products can be prepared initially by forming a composition from water and corn flour. The dough or corn mash composition is then extruded, and cut into the desired shape for baking in the process of the invention. There are many variations on this basic procedure for manipulating flour or dough into a shape suitable for the present process. For example, see U.S. Pat. Nos. 3,600,193 (mixing corn flour with seasonings); 3,922,370 (mixing water, rice and rice flour); and 3,348,950 (mixing corn, sucrose, water, and corn grits). Generally, the process of the invention can be used with all foods that were heretofore fried.

Production of food chip products in accordance with the present invention is schematically illustrated in FIGS. 1 and 2, using potatoes as an example. It is appreciated that the other food products disclosed above can also be used in this process without departing from the scope of the invention.

As shown in FIG. 1, raw potatoes 10 which may be peeled or unpeeled are sliced by a vegetable slicing device 14. The preferred potato variety are those of higher specific gravity (so-called "chipping potato") which are cut to a thickness of between about 0.04 inch and about 0.08 inch (1.0 mm and about 2.0 mm). Most preferably, these slices 16 are in the range between of about 0.06 inch (1.5 mm) and about 0.07 inch (1.8 mm) in thickness. One example of a suitable slicing device 14 is a centrifugal slicer. Commercially-available slicing devices include the Grote TM slicer (Columbus, Ohio) and the Urschell TM slicer (Valparaiso, Ind.).

The slices 16 are washed in device 18 (such as a water bath or spray system) with an aqueous solution such as tap water or distilled water. This washing step extracts surface starch from the slices and reduces their stickiness to help separate the slices while in the baking oven. The rinsing procedure can last between about 15.0 seconds and about 60.0 seconds. The temperature of the water varies between about 59° F. (15° C.) and about 86° F. (30° C.). The slices can, alternatively, be blanched in water at temperatures between about 160° F. (70° C.) and about 200° F. (95° C.).

After the slices 16 are washed in device 18, any excess surface water present can be removed by use of conventional "air knives"-type air jets (not shown). Air knives are a type of forced air currents generally used to remove surface coatings. The air knives use jets of air directed from above and below the raw, freshly washed and sliced, potato slices. These air currents typically have flow rates between about 50 and about 60 $ft^3$/min.

The slices 16 are then layered in a plurality of layers 17 onto a continuous conveyor belt 12 and transported, without any cooking oils or fats (referred to collectively as "oils"), into the baking oven 20. The conveyor belt 12 is an important feature of the present process, as described in more detail with reference to FIG. 2.

Applicant has discovered that a critical factor in forming chip-like foods, without use of oils, is the manner in which the multiple-layered food slices are baked.

Use of a multiple-layered food product is advantageous because a larger amount of food can be prepared at any one time. Conventional electric, gas or microwave ovens are generally unsuitable for cooking multiple-layered food items because of uneven heating and self-shielding within the layered structure. Also, individual layers of multiple-layered food products will not separate from each other in these kinds of ovens and the foods will not be uniformly cooked. Furthermore, these techniques allow for insufficient removal of water from the food product, resulting in products which are not fully desiccated and, therefore, not crispy.

Referring now to FIG. 2, a cross-sectional view of oven 20 is shown. An impingement-type oven is preferred for practicing the process of the present invention. The oven uses heated air or steam ejected at a high pressure through an array of tubes 28 into an oven chamber. Although only four tubes 28 are shown for simplicity, it is understood by those skilled in the art that the array of tubes in a typical impingement oven, used in the process of the present invention, utilizes many more tubes. The oven 20 includes a pan portion 22, on and through which continuous conveyor belt 12 runs. The conveyor belt 12 has a portion of its surface coated with a non-stick material 24, such as Teflon ® synthetic resin polymer. A plurality of projections or ridges 26 that are substantially orthogonal to surface 36 of belt 12 extend along surface 36 perpendicular to the direction of travel of the conveyor belt 12. The conveyor belt 12 moves through the impingement oven in a direction indicated by arrows A. The oven 20 operates using hot air or steam forced downwardly at high velocity in a direction of arrows 30 toward conveyor belt 12 through tubes 28. The ejected hot air hits the belt and is reflected back toward the tubes as indicated by arrows 32 up the sides of the oven. The air may be dried and then filtered of any particulate matter and reheated by a burner (not shown). The reheated air can be ejected through the tubes 28 and this process may be repeated several times.

The flow of heated air or steam in oven 20 creates a bed of hot air that suspends the multi-layered food product 17 above the upper surface 36 of conveyor belt 12. The food product 17 bounces as it contacts the surface of the belt, and the chips can become substantially vertically oriented relative to the belt. The food product dries out in the "fluidized bed" of hot air from the topmost layer down. As the air flows down on the bed of chips they begin to separate.

The ridges 26 of belt 12 provide a unique feature of the present invention in that they provide movement of the suspended food products in the fluidized bed of hot air. Without ridges 26 on the conveyor belt, the fluidized bed of food products may actually move at a different speed than the belt. This can be inefficient and can force the food product to remain in the oven longer than is required. The ridges 26 have a height 38 that is substantially equal to the height 40 of the multiple-layered food product in the fluidized bed under tubes 28. The ridges 26 act as barriers to push the suspended food along the conveyor belt surface in the direction of travel and physically constrain the food product. This effectively ensures substantial mutual motion between the suspended food in the fluidized bed of hot air and the conveyor belt, ensuring a more even fluidization process and better baking. The ridges 26 on the conveyor belt 12 are preferably about 2.5 inches (6.5 cm) high and are spaced in intervals across the conveyor belt surface of about 20.0 inches (50.0 cm). It will, however, be appreciated that the ridges can be higher or lower, depending on the type of food and height of layered food product. Ridges that are substantially curved with respect to surface 36 of belt 12 can also be used without departing from the scope of the present invention.

The length of the tubes 28, through which hot air or steam emerges, is preferably about 20.0 inches (50 cm) long with a diameter of between about 0.7 inch (1.8 cm) and 1.0 inch (2.5 cm). Static pressures measured at the nozzle 29 of tubes 28 can be as high as about 6.5 inches $H_2O$. Higher static pressures can be achieved by introducing larger amounts of reheated hot air into the oven chamber.

Fluidized bed impingement ovens, such as those that utilize superheated steam flowing from the sides and/or bottom of the conveyor belt are also suitable for practicing the process of the present invention. Moreover, tubes 28 are optional and the hot air or steam can be introduced into the oven through other openings.

In the preferred embodiment of the invention, the food slices 16 are exposed to a higher pressure in a first zone for several minutes to ensure that the individual food pieces are separated. The pressure is then lowered in a second zone for a second period of time. Similarly, in a third zone the pressure is reduced for a predetermined period of time to finish cooking the food products.

A preferred first static pressure in the first zone is between about 4.5 and about 6.5 inches $H_2O$ for about 1.5 and about 2.0 minutes at a temperature of about 450° F. This corresponds to an air velocity through nozzle 29 of between about 10,000 and about 15,000 cubic feet/minute. The first applied pressure dries the slices by releasing additional moisture from the potato slices 16 and, therefore, facilitates separation of the slices from each other and formation of a thin, chip-like product. In the second zone the pressure is lowered to between about 2.5 and about 3.0 inches $H_2O$ to achieve further separation of the slices. This corresponds to an air velocity of between about 7,000 and about 10,000 cubic feet/minute. This lower pressure is applied at a temperature of about 420° F. for a period of between about 1.5 and about 2.0 minutes, after which the food slices have been substantially desiccated and cooked. Then, in a third zone, the pressure is lowered to about 1.5 and about 2.0 inches $H_2O$ for a period of between about 2.5 and 3.0 minutes at a temperature of about 400° F. This corresponds to an air velocity of about 6,000 cubic feet/minute. The temperature of the oven may vary with the variety of potato and can be reduced as the chips dry. Typically, the oven temperature can range from between about 300° F. to about 450° F.

Referring again to FIG. 1, the result of this baking procedure is that the potato slices 16 now have the appearance of potato chips and can be conveyed to a drier 42 for between about 15.0 and about 30.0 seconds. Drier 42 is optional, and the chips can be air-dried for the same result.

A yield of between about 16.0 and about 20.0 percent, by weight, of the initially prepared multiple layers of food product are produced as potato chips using the process of the present invention. Preferably, the yield is between about 18.0 and about 20.0 percent, by weight. Higher yields are generally obtained by using potatoes with higher specific gravities, due to more potato pulp and less water content. Different specific gravities of the initial raw potato call for different cooking temperatures and pressures, however the total cooking time of between about 5.0 minutes and about 7.0 minutes (most preferably, about 2.0 minutes at one pressure, about 2.0 minutes at a lower pressure, and between about 2.0 and about 3.0 minutes at an even lower pressure) is held constant, depending upon whether a light or dark chip is preferred.

After drying the chips, they are conveyed to a rotating drum 44 for seasoning. A flavoring/seasoning mix is sprayed onto the tumbling potato chips in the rotating drum. Because the chips come out of the impingement oven in a dessicated condition, it is necessary to add a bonding solution to the chips so that salt, and/or flavoring can adhere to the chip surface.

The solution is applied to both sides of the potato chips, preferably by spraying using atomizer 43a contained within rotating drum, or tumbler The chips are then salted and/or seasoned with a variety of materials well-known to those of skill in the art by spraying with atomizer 43b, also within tumbler 44.

After seasoning, the chips are optionally layered onto a pan and then placed into a drying oven 46 for about 2.0 minutes at about 250° F. (121° C.). This heat treatment results in further adherence of the salts, and/or flavorings onto the potato chip surface. Particularly preferred seasonings are those that impart a fried taste, although seasonings such as barbecue, onion/sour cream, and the like can be used. The chips are then removed from oven 46 onto a separate conveyor 48 and prepared for packaging.

A preferred method for seasoning potato chips includes the steps of:

(a) mixing a measured amount of carbohydrate-based material with a measured amount of warm water, preferably a concentration of about 3 parts powdered material to about 7 parts warm water are used;

(b) adding flavoring;

(c) agitating the solution to facilitate dissolving the carbohydrate-based material;

(d) spraying the solution with atomizer 43a onto both sides of the potato chips in tumbler (e) sprinkling salt and/or seasoning with atomizer 43b onto both sides of the potato chips in tumbler 44, if desired;

(f) optionally layering the potato chips onto a pan and placing the chips in a drying oven for about 2.0 minutes at about 250° F.;

(g) allowing the chips to cool.

Another method for seasoning the potato chips comprises the following steps:

(a) adding a given amount of seasoning to a solution of gum or carbohydrate-based material, preferably in a weight concentration of about 0.02 percent;

(b) spraying this solution onto both sides of the potato chips;

(c) salting and/or seasoning the potato chips and layering them on a pan in a drying oven;

(d) drying the chips for about 2.0 minutes at about 250° F.

After drying the potato chips to ensure adherence of the seasoning mix onto the chip, the potato chip is ready for packaging and distribution.

The present invention will be further illustrated by the following example, which is intended to be illustrative in nature and is not to be construed as limiting the scope of the invention.

EXAMPLE

Non-Fat Potato Chips Produced With Multilayer Baking

Whole potatoes were sliced to about 1.5 mm thickness and washed briefly with water to remove extractable surface starch. The rinsing process lasted between 15.0 and 20.0 seconds. The slices were then conveyed on a continuous, ridged conveyor belt coated with Teflon ® synthetic resin polymer. The potato slices were impinged with forced hot air at a temperature of between about 400° F. and about 450° F. In all experiments, the total baking time was about 7.0 minutes, separated into three periods (2 minutes; 2 minutes; and 3 minutes) at three different pressures. The first baking period was at a higher pressure than the second or third baking periods. The operating parameters and yield for various types of potatoes are presented in Table I.

TABLE I

| Sample No. | Potato Type[a] | Temperatures (°F.) | Pressures (in.H$_2$O) | Yield (%) |
| --- | --- | --- | --- | --- |
| 1 | Nor-chip | 450, 420, 400 | 6.5, 3.0, 2.0 | 18.0 |
| 2 | Snowden | 450, 420, 400 | 6.5, 3.0, 2.0 | 17.0 |
| 3 | 945 | 450, 420, 400 | 6.5, 3.0, 2.0 | 18.0 |

[a] In order of decreasing specific gravity

The temperature varied with the potato variety and the different baking zones. The chips were dried and their percent yield was determined.

In several cases, the potato chips were produced with a fried-type seasoning using the procedures outlined previously. Shape, touch and crack test results of this process were favorable.

The process described herein is an alternative to other cooking processes that utilize oils in all or part of their operation. The entire process of cooking and seasoning described herein addresses dietary concerns such as fat intake and low cholesterol intake by providing a food chip product, without oil, that is manufactured without frying of any kind.

It should be understood that the foregoing description of the invention is intended merely to be illustrative thereof, that the illustrative embodiments are presented by way of example only, that other modifications, embodiments, and equivalents may be apparent to those skilled in the art without departing from its spirit.

Having thus described the invention, what is claimed is:

1. In a process for producing food chip products, the improvement comprising:
   forming multiple layers of a food product;
   washing said food product layers to remove extractable surface starch;
   baking said food product layers in an impingement oven at a temperature of between about 300° F. and about 450° F. for a first period of between about 1.5 and about 2.0 minutes at a pressure of between about 4.5 and about 6.5 inches H$_2$O; then
   baking said food product layers in an impingement oven at a temperature of between about 300° F. and about 450° F. for a second period of between about 1.5 and about 2.0 minutes at a pressure of between about 2.5 and about 3.0 inches H$_2$O; and then
   baking said food product layers in an impingement oven at a temperature of between about 300° F. and about 450° F. for a third period of between about 2.5 and about 3.0 minutes at a pressure of between about 1.5 and about 2.0 inches H$_2$O to form said food product layers into food chip products.

2. The process of claim 1, wherein said multiple layers of food product are formed from a food selected from the group consisting of potato, banana, plantains, yams, sweet potato, corn, rice, and combinations thereof.

3. The process of claim 2 wherein said multiple layers of food are formed from potatoes and potato chip products produced therefrom are between about 16.0 and 20.0 percent, by weight, of the initial weight of said potatoes.

4. The process of claim 1 wherein said layers are baked in said impingement baking oven utilizing forced hot air.

5. The process of claim 1 wherein said food are baked in said impingement baking oven utilizing forced steam.

6. The process of claim 1 wherein said food product is arranged on a conveyor belt, coated with a non-stick material and having a plurality of ridges arranged perpendicular to a long axis of the belt.

7. The process of claim 1 further comprising the step of flavoring said food chip products.

8. The process of claim 7 further comprising the step of drying said flavored food chip products.

9. The process of claim 8 wherein drying said food chip products comprises placing said chips into a drying oven for about 2.0 minutes at a temperature of about 250° F.

* * * * *